United States Patent [19]

Bouvet

[11] 4,106,367
[45] Aug. 15, 1978

[54] PRESSURE CONTROL APPARATUS FOR THE AUTOMATIC TRANSMISSION OF AUTOMOTIVE VEHICLES

[75] Inventor: Jean-Marie Bouvet, Boulogne-Billancourt, France

[73] Assignees: Regie Nationale des Usines Renault, Boulogne-Billancourt; Automobiles Peugeot, Paris, both of France

[21] Appl. No.: 619,187

[22] Filed: Oct. 3, 1975

[30] Foreign Application Priority Data

Oct. 7, 1974 [FR] France .................................. 74 33669

[51] Int. Cl.² ........................................... B60K 41/18
[52] U.S. Cl. ............................................ 74/866; 74/863
[58] Field of Search ........................ 74/866, 863, 864

[56] References Cited

U.S. PATENT DOCUMENTS

| 2,065,429 | 7/1971 | FRX | |
|---|---|---|---|
| 3,703,109 | 11/1972 | Irie et al. | 74/866 |
| 3,710,647 | 1/1973 | Dach et al. | 74/866 X |
| 3,726,159 | 4/1973 | Mizote | 74/866 |
| 3,739,661 | 6/1973 | Harrison | 74/866 |
| 3,752,011 | 8/1973 | Casey et al. | 74/866 X |
| 3,792,631 | 2/1974 | Mori | 74/866 |
| 3,805,640 | 4/1974 | Schneider et al. | 74/866 X |
| 3,813,964 | 6/1974 | Ichimura et al. | 74/866 |

FOREIGN PATENT DOCUMENTS

| 2,109,792 | 5/1972 | France. | |
|---|---|---|---|
| 2,084,771 | 12/1971 | France. | |
| 2,074,100 | 10/1971 | France. | |
| 2,057,851 | 5/1971 | France. | |
| 2,021,940 | 10/1972 | France. | |
| 2,020,969 | 7/1972 | France. | |
| 2,017,651 | 7/1972 | France. | |
| 2,336,772 | 1/1974 | Fed. Rep. of Germany | 74/866 |

Primary Examiner—Samuel Scott
Assistant Examiner—Lance W. Chandler
Attorney, Agent, or Firm—Owen, Wickersham & Erickson

[57] ABSTRACT

A control generator starting from supplied data relative to the functioning of the transmission and of the motor, supplies a transfer voltage proportional to the line pressure. The control comprises a primary electrical loop containing a pressure tap and a secondary hydraulic loop comprising an electro-hydraulic transducer. The line pressure is thus controlled. The stability and control performance of the transmission are improved by means of electrical correction circuits. The apparatus may be adapted to any desired type of automatic transmission.

13 Claims, 17 Drawing Figures

PRESSURE CONTROL APPARATUS FOR THE AUTOMATIC TRANSMISSION OF AUTOMOTIVE VEHICLES

The present invention relates to an electronic apparatus for controlling the supply pressure of the control devices of an automatic transmission for a power unit, for example, that of an automotive vehicle.

Automatic transmissions used in such automotive vehicles generally comprise hydraulic control devices which are capable of actuating the brake or clutch elements which permit speed changes, in other words, the automatic selection and engagement of a given transmission ratio.

The supply or feed pressure of these control devices which is often called the "line pressure" must be adapted as a function of a certain number of elements relative to the movement of the vehicle and to the functioning of the transmission. It is thus necessary, in order to avoid jolts at the moment of the engagement of a transmission ratio, to modify the line pressure, and thereby the transmission coupling of the friction members as a function of the load of the power plant and as a function of the speed of the vehicle or, what amounts to the same, of the rotational speed of the motor propulsion unit or of the turbine of the hydraulic torque converter which the automatic transmission comprises.

Devices for driving automatic gear cases are already known in which the various stages of reduction are actuated by an auxiliary hydraulic force. Most often, the hydraulic fluid is conducted to the control members of the transmission gear case by means of distribution valves which in turn are fed by the fluid at the line pressure. This line pressure is then regulated to its desired value by a device which may comprise a pilot valve, which in turn is driven, for example, through the intermediary of a diaphragm device by the vacuum prevailing in the input manifold of the heat engine.

Electronic devices for regulating line pressure are known, also, comprising a plurality of electro-hydraulic converters which are controlled by a voltage supplied from a control device receiving information in electrical form relative to the load of the heat engine and to the rotational speed of the members of the hydraulic torque converter. For some of these devices, descriptions are found of the control of line pressure comprising a hydraulic return loop.

These known devices are generally of complex construction and cannot be easily adapted to automatic transmission gear cases having different characteristics. This is the reason why such devices have until now not been produced industrially.

One object of the present invention is to provide an electronic control apparatus which makes it possible to vary the line pressure in proportion to the torque to be transmitted according to an experimentally predetermined law, the apparatus of the invention having stability characteristics which have been impossible to attain earlier. Another object of the invention is to provide such a control device as may be very easily adapted to the characteristics of a particular transmission gear box.

Another object of the invention is to provide a control apparatus enabling the variation of line pressure as a function of the torque to be transmitted, both when running at a constant transmission ratio and during the transitory stage when changing from one such ratio to another.

In an apparatus for controlling the feed or supply pressure of the control devices of an automatic transmission for a vehicle motor-propulsion power unit according to the present invention, electrical signals representing information relative to the functioning of the automatic transmission and of the vehicle's power unit are converted into hydraulic signals and determine at every moment the supply pressure or line pressure as a function of that information.

The apparatus of the invention comprises an electronic assembly in the form of a control generator supplying an electrical transfer voltage which is the function of the above-mentioned information relative to the functioning of the transmission and of the power unit. The magnitude of the electrical output of the control generator is thus proportional to the hydraulic line pressure and varies as a function of at least three parameters according to a predetermined experimental law taking into account the torque to be transmitted and the kinetic pressures due to the rotating hydraulic members.

In a preferred embodiment of the apparatus of the present invention, the information or data relative to the functioning of the transmission and of the heat engine comprise the state of the transmission ratio in engagement or in the course of engagement, the rotational speed of a transmission member which may, for example, be the turbine of the hydraulic converter and, finally, the load of the engine which may be measured, for example, by the position of the throttle of the butterfly valve of the heat engine or by any other physical magnitude which is proportional to it. In an advantageous embodiment, the load of the heat engine may be measured by means of an ionic air flow meter placed in the input manifold.

The control generator preferably comprises first means supplying a first voltage which is a decreasing linear function of the rotational speed of a transmission member, such as the turbine of the converter. The gradient of this straight line is a function of the state of the transmission ratio in engagement or in the course of engagement. The control generator also comprises second means supplying, starting from the said first voltage, a second voltage which is a decreasing linear function analogous to the first voltage, but whose position is displaced as a function of the load of the heat engine. Third means supply, starting from said second voltage and the state of transmission ratio, in engagement or in the course of engagement, a third voltage which is a decreasing function of the rotational speed, represented by a curve comprising two substantially linear portions connected by a vertex or point of discontinuity. The respective gradients of each said linear portion are a function of the state of the transmission ratio in engagement or in the course of engagement.

Finally, the control generator further comprises fourth means supplying, starting from the said third voltage and from the information relative to the load of the heat engine, a fourth voltage which is a decreasing function of the said rotational speed of a transmission member and represented by a curve comprising two linear portions connected by a vertex or point of discontinuity, whose position is a function of the load of the heat engine.

It is thus possible, by the combination of these different means, to obtain a transfer voltage which may be represented by a system of linearized curves giving an approximation of a real curve system which may be determined experimentally and which represents the variations of the output torque as a function of the rotational speed, for example, of the turbine of the torque converter used in an automatic transmission. This curve system is parametered by means of information relative to the state of the transmission ratio and to the load of the heat engine.

Such a linearized curve system is easily obtained with the aid of integrated linear circuits.

It is thus possible to adapt very easily the control apparatus of the present invention to different types of vehicle power units by simply varying the input parameters of the control generator, which automatically modify the curve system obtained, that is, of the transfer voltage supplied by the control generator of the invention.

In accordance with the invention, the control apparatus preferably comprises a primary return loop supplying an electrical signal and provided with a pressure tapping element and a secondary return loop supplying a hydraulic input signal to an electro-hydraulic translator or converter.

The invention will be better understood in studying an embodiment of the apparatus in accordance with the invention as applied to an automatic transmission comprising three ratios of forward movement and one ratio of reverse movement, as described in detail and given by way of an example which is in no way limiting. The description will be illustrated by the attached drawings, in which.

Figure 1A:
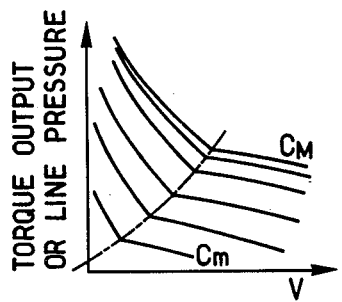
FIGS. 1a and 1b are diagrams of the variation of the output torque or line pressure as a function of the rotational speed of the turbine of a torque converter for a given engaged ratio.

As will be seen in FIG. 1a, the output torque of a hydraulic converter of automatic transmission of an automotive vehicle varies as a function of the rotational speed V of the converter, which is indicated in abscissae. The torque, indicated in ordinates, also varies as a function of the load of the heat engine, as shown by a series of curves lying between a curve at the maximum value CM of the load and a curve of the minimum load value Cm. The curve system of FIG. 1a is drawn by way of simplification for a specific engaged transmission ratio and is composed of a series of curves each having a point of discontinuity where their gradient varies in a discontinuous manner. All points of discontinuity of the system lie along a curve that is little different from a straight line segment, as shown in broken lines in FIG. 1a. In order to obtain engagement of the various ratios or speeds of the automatic transmission without jolts, it is known that it is preferable to maintain the supply pressure to the control devices of the speed box to a value proportional to the output torque of the converter. It is therefore necessary to achieve a pressure control capable of following one of the curves of the system of FIG. 1a; for example, the curve A of FIG. 1b showing the change of line pressure as a function of the rotational speed V of the turbine of the converter.

Figure 1B:
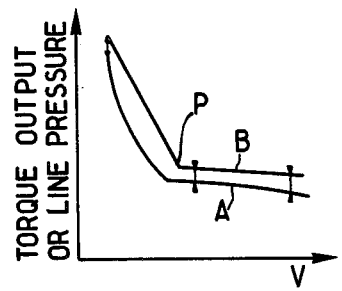

In order to obtain a margin of safety, which may become necessary due to the variations of the torque characteristics of propulsion power units, it is preferable to control the line pressure so that it remains slightly above the required theoretical pressure shown by the curve A of FIG. 1b.

Further, in order to facilitate practical realization of the control apparatus of the present invention, the pressure is preferably controlled so as to follow a curve B, seen in FIG. 1b, which constitutes a linearized approximation of the theoretical curve A. The safety margin is shown in FIG. 1b by the substantially constant spacing lying between the curves A and B, the curve B always remaining above the theoretical curve A.

Finally, for a given load of the heat engine and for an also given engaged transmission ratio, it is desirable that the control apparatus control the line pressure in such a way that it will correspond in all points to the curve B, which is constituted by a first rectilinear portion decreasing as a function of the rotational speed of the turbine and by a second portion, also rectilinear and decreasing, of a lesser gradient than the preceding one, the two said portions meeting at a point of discontinuity P.

Figure 2:
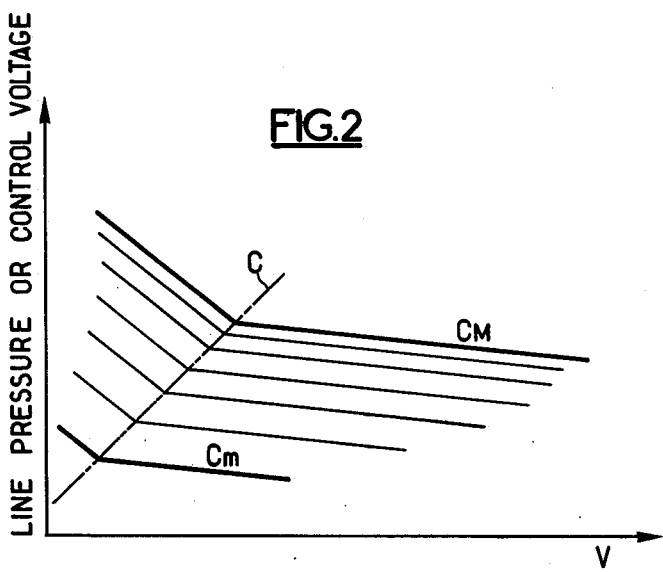
FIG. 2 is a diagram showing the system of characteristics of transfer voltage or of line pressure obtained in the control apparatus of the present invention as a function of the rotational speed of the turbine and of the input parameter which constitutes the load of the heat engine, the system being drawn for a given engaged transmission ratio.

FIG. 2 shows, for a given engaged ratio, the linearized curve system starting from the curves of FIG. 1a and illustrating the changes of line pressure as a function of the rotational speed V of the turbine for different values of the load of the heat engine. The upper curve, indicated as CM, corresponds to the maximal load of the heat engine while the lower curve, indicated as Cm, corresponds to the minimal load. The different intermediate curves, for a regular procession of loads, are all obtained by translating each one in relation to the others, the points of discontinuity being located on a straight line C. It will be further noted that the spacing between two successive curves diminishes as the motor load increases.

For a different transmission ratio reduction, a different curve system will be obtained which is analogous to that of FIG. 2, but the straight line portions will each have different gradients, and the points of discontinuity will be located on a line distinct from the line C.

As will be seen later, the control apparatus of the present invention comprises a control generator which delivers a transfer voltage proportional to the line pressure. FIG. 2 thus also shows variations of the transfer voltage supplied by the control generator as a function of the rotational speed V of the turbine.

Figure 3:
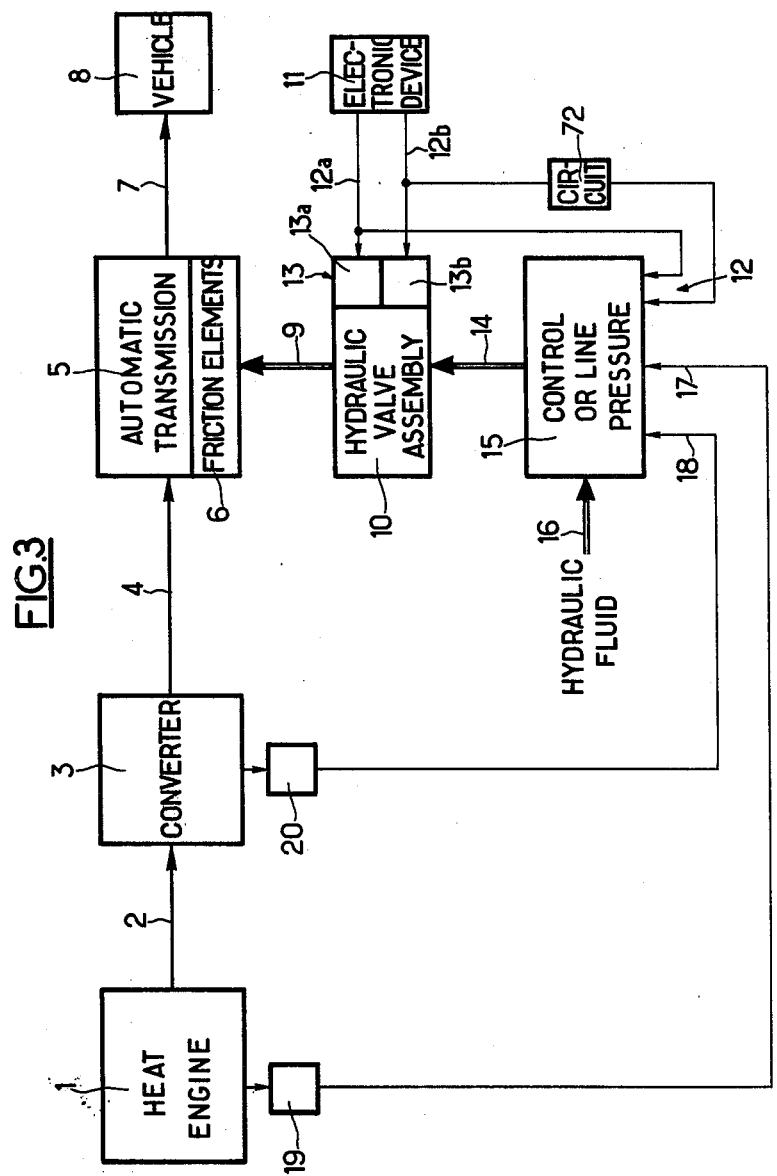
FIG. 3 shows schematically the arrangement of the assembly of an automatic transmission mechanism provided with an electronic pressure control, in accordance with the present invention.
Figure 9:
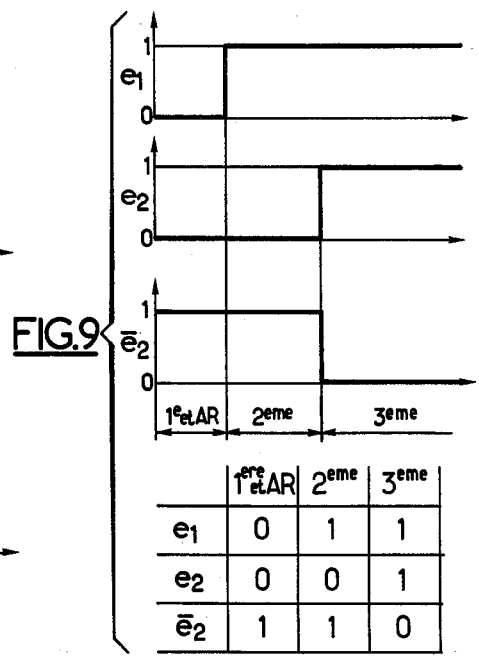

In the schematic representation of FIG. 3, numeral 1 designates a heat engine mechanically coupled by an input member 2 to a hydro-kinetic converter 3. The converter 3 is in turn mechanically connected by a driven member 4 to an automatic transmission comprising, for example, a multi-ratio epicycloidal gear (diagrammatically indicated by a block 5) and hydraulically actuated friction elements (diagrammatically indicated by a block 6). The mechanical output 7 of the transmission 4 drives a vehicle diagrammatically indicated by the block 8. The friction members 6 are fed with hydraulic fluid under pressure through a pipe 9 connected to a block 10 comprising a hydraulic valve assembly. An electronic device of known construction and indicated by numeral 11 controls the speed changes by supplying electrical signals 12a and 12b to electro-hydraulic translators or converters 13a and 13b, shown schematically in the form of the block 13. The latter act on the valves of the block 10 to activate selectively the friction elements 6, as a function of the information or data contained in the signal 12, thereby achieving the mechanical connections necessary for obtaining the desired speed ratio. The combination of the two signals 12a and 12b supplies information both on the engaged ratio and on the intermediate position between two ratios of the transmission. A circuit 72 forms the complement of the signal 12b, as will be seen further below. Finally, the information, designated by numeral 12 in FIG. 3, shows the state of the ratio in engagement or in the course of engagement. Signals 12a and 12b sent to electrohydraulic transducers 13a and 13b are voltages that change from a "high" (1) level to a "low" (0) level. They are produced by a device of well known construction. Their state changes 0→1 or 1→0 depending on the vehicle speed and on the accelerator pedal depression, i.e. the driver's action. These states do not occur instantaneously, the change speed depending on the switching speed of the electronic circuits. Although the hydraulic transducers 13a, 13b set the speed ratio in response to the logic combination of e1 and e2 provided by signals 12a and 12b as shown in the table of FIG. 9, they also supply information to control circuit 21 on the intermediate position between two speed ratios as explained above. The electrohydraulic elements, which control the fluid pressure, have a much slower response time to the electric signals' applied thereto and the information of the ratio about to be engaged is due to such time lapse.

The hydraulic valves which constitute the block 10 are driven by a hydraulic fluid conveyed through a pipe line 14 at a supply pressure which hereinafter will be called the line pressure. In accordance with the present invention, this line pressure is obtained by a control device indicated by the numeral 15, which is fed through a conduit 16 with hydraulic fluid supplied by a pump, not shown in the Figure.

In this embodiment, the control device 15 is operated by three parameters or data relative to the conditions of motion of the vehicle 8. The first of these data is the speed ratio, in engagement or in the course of engagement, shown by the speed change control signal 12.

The second of these data is constituted by the load of the heat engine 1 represented by the signal 17 coming from a detector 19 connected to the heat engine 1. In a preferred embodiment, the load of the heat engine may be measured by the pneumatic flow in the input manifold by means of an ionic flow meter provided with an electronic control device. In another embodiment, the load of the heat engine may be measured in a manner per se known by a potentiometer coupled to the butterfly axis of the carburetor throttle. It will be understood that the load of the heat engine may in fact be determined by any suitable means, such as the position of the butterfly valve or throttle blade or any other physical magnitude which is proportional to its position.

The third input parameter is shown by the signal 18 corresponding to the rotational speed of the input shaft 2 or of the output shaft 4 of the converter 3. The signal 18 is obtained with the aid of a detector 20 of known type.

Figure 4:
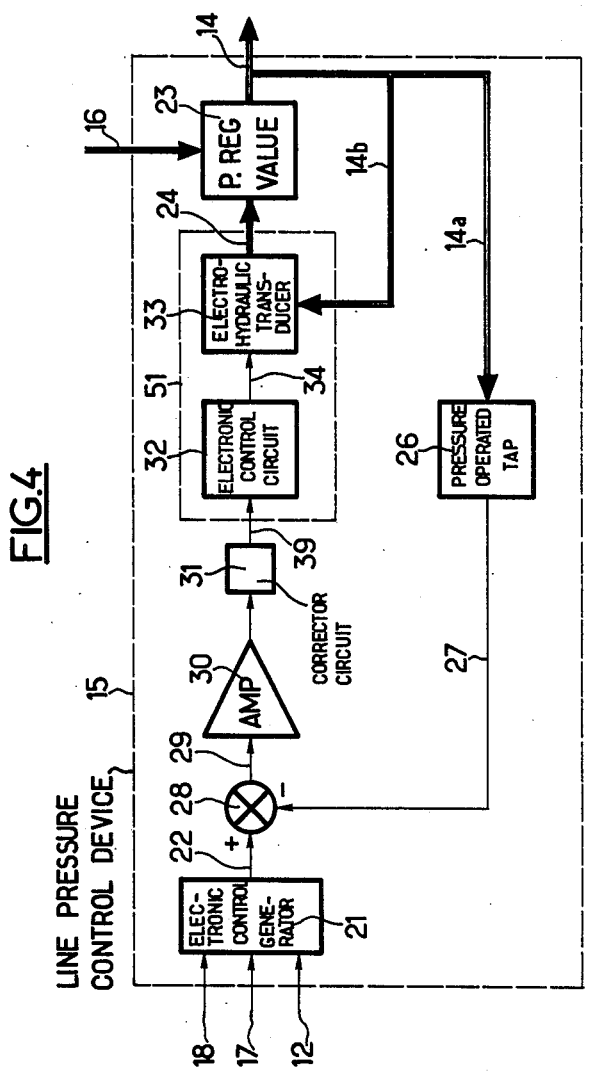
FIG. 4 is a synoptic diagram of the pressure control apparatus in accordance with the present invention showing the primary electrical loop and the secondary hydraulic loop.

The synoptic diagram of FIG. 4 represents the block 15 seen in FIG. 3 which comprises the assembly of elements forming the control apparatus of the present invention. As may be seen in FIG. 4, the control apparatus comprises an electronic control generator 21 which delivers a transfer voltage 22 as a function of three input parameters which are, (1) the signal 12 representing the state of the reduction ratio in engagement or in the course of engagement, (2) the signal 17 representing the load of the heat engine 1, and (3) the signal 18 representing the rotational speed of the input or output shaft of the converter 3.

A hydraulic member 23 which may, for example, be a pilot valve or a pressure-regulating valve, is fed with hydraulic fluid through the conduit 16. The member 23 supplies at its output the line pressure 14 which, as has been seen with reference to FIG. 3, serves to operate the valve block 10.

The line pressure feeds, through the intermediary of a pipe line 14a, a pressure tap 26 which delivers an output voltage 27 called return voltage. This is one of the inputs of a differential comparator or amplifier 28 which makes the comparison or subtraction between the transfer voltage 22 supplied by the control generator 21 and the return voltage 27 issuing from the pressure tap 26. The comparator 28 delivers an error signal 29 which is the result of this comparison. The electrical signal 29 is amplified by an amplifier 30 and treated by a corrector circuit 31.

The principal return loop of the control device comprising the pressure tap 26, the comparator 28 and the elements 30 and 31 thus constitute essentially an electrical loop whose characteristics are easily changed. It is thus that the gain of the amplifier 30 will change the loop gain of the controlled system. In the same manner, it is easy to provide at the corrector circuit 31 a preadmission corrector circuit of known type capable of improving the stability of the controlled system, as well as its performance from the point of view of regulation.

The corrector circuit 31 supplies an output voltage 39 which feeds an assembly 51, comprising an electro-hydraulic transducer or translator, or converter 33 associated with its electronic control circuit 32. The latter supplies an electrical signal 34 to the converter 33 which supplies a pilot pressure 24 which controls the hydraulic member 23.

Further, in accordance with the present invention, the control apparatus comprises, in addition to the primary electrical loop provided with the pressure tap 26 fed through the pipe line 14a, an entirely hydraulic secondary loop fed through a pipe line 14b conveying also the pressure signal 14 issuing from the hydraulic member 23 and constituting the secondary input of the electro-hydraulic converter 33.

In this manner, it will be understood that the control characteristics are particularly improved and that it is very easy to modify these characteristics by introducing electrical members such as 30 or 31 into the primary electrical loop, so as to eliminate difficulties inherent in hydraulic members, such as, for example, problems of magnetic hysteresis or variation of characteristics as a function of temperature.

Figure 5:
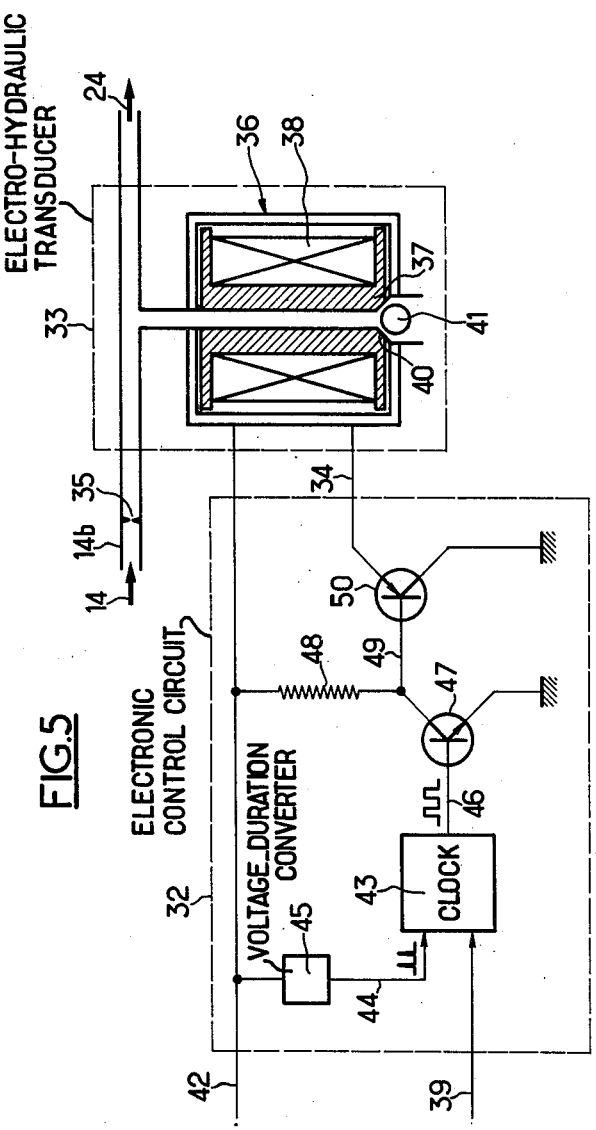
FIG. 5 is a schematic representation of a first embodiment of an electro-hydraulic pilot converter used in the secondary hydraulic loop shown in FIG. 4.

FIG. 5 illustrates a first possible embodiment of the assembly 51 shown in FIG. 4. As will be seen in FIG. 5, one finds in it the electro-hydraulic transducer or converter 33 proper and its electronic control circuit 32.

The device 33 comprises a hydraulic potentiometer of known principle, with proportional electrical control.

The hydraulic fluid under the line pressure 14 enters into the device 33 through the pipe line 14b having a first restricted orifice 35. An electrical ball check valve 36 comprises a magnetic circuit 37, a coil 38, a ball seat 40 and a magnetic ball 41 acting as obturator or check valve. The space comprised between the magnetic ball 41 and the ball seat 40 forms a second restricted orifice of the hydraulic potentiometer.

As is known, this results, at the output of the device 33, in a pilot pressure 24 which is the function of the input pressure 14 as well as of the relation between the two restricted orifice cross-sections of the hydraulic potentiometer. The restriction at the orifice 35 being fixed, it is possible to control the pilot pressure 24 by varying the position of the magnetic ball 41, that is, by modifying the electrical feed to the coil 38. The ball 41 of the electromagnetic valve 36 is, in effect, subjected to an electromagnetic attraction force, a hydraulic repulsion force, and a dynamic force. As a function of the magnitude of the electrical signal 34 feeding the coil 38, the ball 41 positions itself at a distance from the seat 40, the distance being such that the three said forces counterbalance each other so as to determine a position of the ball and thereby a restriction port cross-section determining the pilot pressure 24.

The control device 32 supplies the electrical signal 34 which feeds the coil 38 of the electromagnetic valve 36. The device 32 is fed by a voltage 42 which is positive in relation to earth. It comprises a voltage-duration converter 43 fed by a continuous voltage constituted by the signal 39 issuing from the corrector device 31 of FIG. 4. The voltage-duration converter 43 also receives impulses 44 supplied by a high-stability clock 45. The signals 46 obtained at the output of the converter 43 have a rectangular shape, and their period is equal to that of the impulses 44. The useful width of the rectangular signal is proportional to the continuous voltage signal 39. The signals 46 act on a transistor 47 whose load is a resistance 48. The signals 49 issuing from the transistor 47 act on a power transistor 50 whose load emitter circuit is the coil 38 of the electro-magnetic valve 36. The continuous voltage 39 constituting the input signal of the control device 32 being proportional to the error signal 29 delivered by the comparator 28 of FIG. 4, it will be seen that the pilot pressure 24 issuing from the electro-hydraulic converter 33 is also proportional to the error signal 29.

Figure 6:
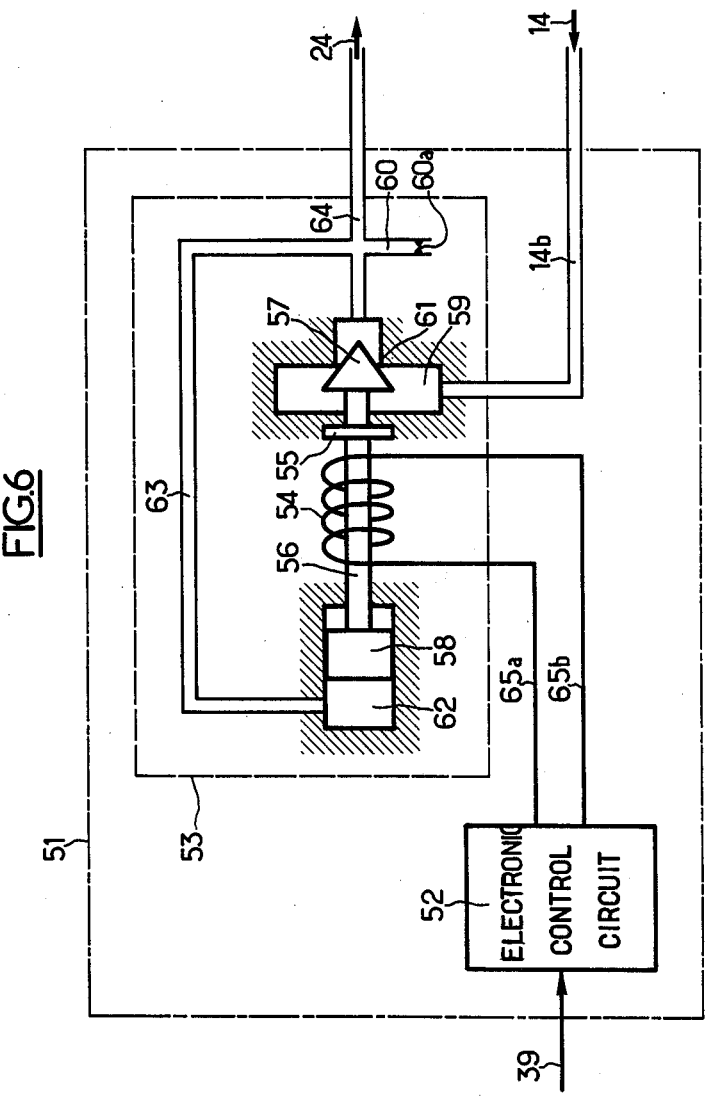
FIG. 6 is a schematic representation of a second embodiment of an electro-hydraulic pilot converter used in the secondary hydraulic loop shown in FIG. 4.

FIG. 6 is a variation of the embodiment of the assembly 51 shown in FIG. 4. Here again, one finds an electrohydraulic converter 53 associated with its electronic control circuit 52.

The converter 53 comprises a magnetic circuit, not shown, comprising a coil 54 and a metal armature 55 mechanically joined to a shaft 56 comprising, for example, at one of its ends a needle valve 57, and at the other of its ends, a piston 58. The hydraulic fluid at line pressure 14 penetrates through the pipe line 14b into a control chamber 59 which comprises a seat 61 which cooperates with the needle valve 57. The seat 61 and the valve 57 thus form a restricted orifice establishing communication between the control chamber 59 or action chamber with a reaction chamber 62 connected to the chamber 59 by a return conduit 63. An output conduit 64 supplies the pilot pressure 24 to the hydraulic member 23 shown in FIG. 4. The assembly is connected by a bleed conduit 60, having a restriction 60a, to a hydraulic fluid reservoir, not shown in the figure.

The coil 54 is fed by an electrical current conveyed by the connections 65a and 65b and supplied by the control circuit 52, which is a voltage-current converter receiving as the input signal the continuous voltage 39 proportional to the error signal 29 issuing from the comparator 28 of FIG. 4.

The device shown in FIG. 6 functions as follows: under the action of an electrical control signal supplied by the voltage-current converter 52 and applied to the coil 54, the armature 55 is subjected to an electromagnetic attraction force which tends to displace the assembly comprising the shaft 56, the piston 58 and the needle valve 57 toward the left of FIG. 6. This force of attraction is a magnitude of transfer. When the valve 57 moves to the left, it tends to move away from its seat 61, that is, to increase the degree of communication between the control chamber or action chamber 59 and the return conduit 63. This results in an increase of pressure in the conduit 63 and therefore in the reaction chamber 62, which is translated by a reaction effort on the rear surface of the piston 58. This reaction effort is proportional to the cross-section of the piston 58 and to the pressure prevailing in the chamber 62. The reaction force opposes itself to the transfer magnitude constituted by the electromagnetic attraction force acting on the armature 55. These two forces counterbalance each other so as to determine a position of the shaft 56 to which a pilot pressure 24 corresponds. One sees, therefore, that one can thus obtain an electro-hydraulic transducer or converter supplying a pilot pressure 24 proportional to the current supplied by the converter 52, that is, proportional to the error signal 29 shown in FIG. 4.

Further, it is seen that in this embodiment of the electro-hydraulic transducer, the latter is a controlled system comprising a hydraulic reaction coil comprising the return conduit 63, the reaction chamber 62 and the piston 58.

As has been shown with reference to FIGS. 1 and 2, it is necessary that the line pressure follow a curve such as shown in FIG. 2, as a function of the rotational speed of the torque converter, of the engaged ratio and of the load of the thermo-motor. The control apparatus of FIG. 4 permits, so far as it is concerned, the obtaining of a pressure signal 14 proportional to an electrical input signal 22. In order to obtain the line pressure corresponding to the system of curves of FIG. 2, it is therefore necessary to place at the input of the control device of FIG. 4, a control generator 21 capable of supplying a transfer voltage corresponding to the system of curves of FIG. 2 as a function of the different input parameters.

Figure 7:
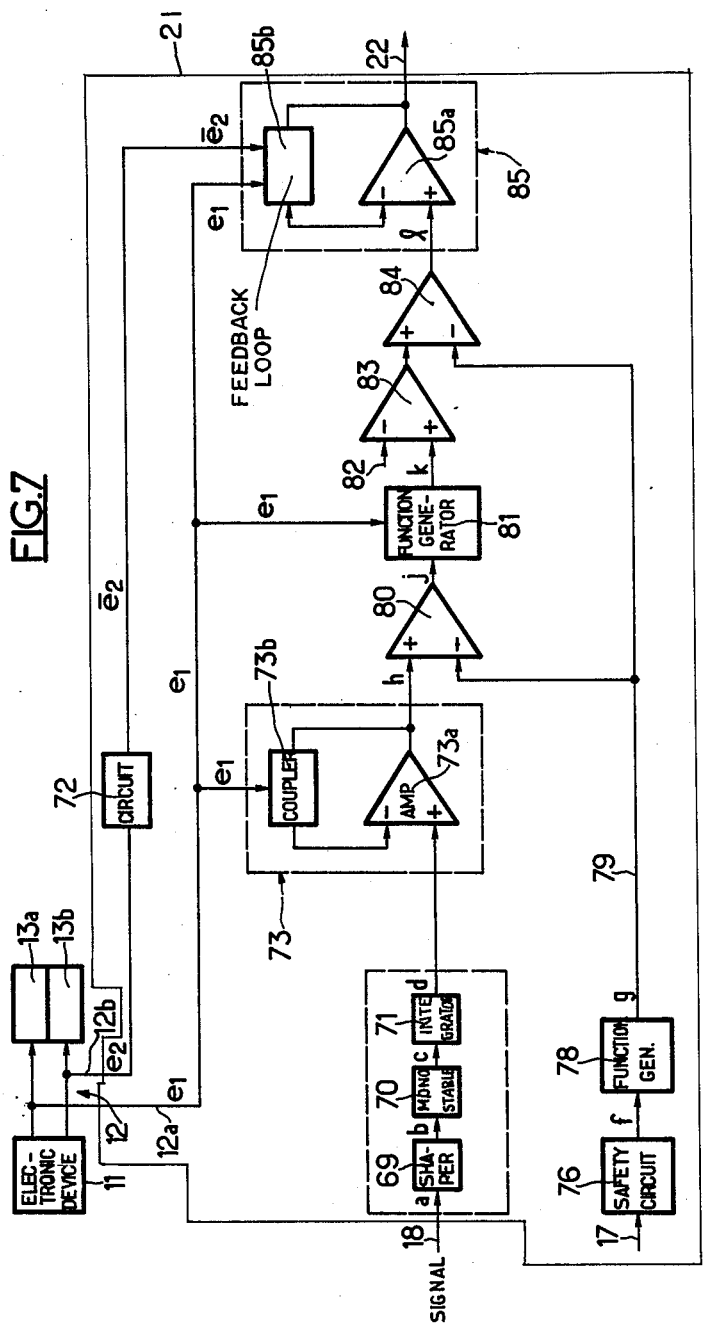
FIG. 7 is a synoptic diagram of the electronic control generator supplying the transfer voltage for the control apparatus of FIG. 4.

The synoptic diagram of FIG. 7 shows the electronic drive generator 21 illustrated in FIG. 4 and supplying the transfer voltage 22 as a function of the input parameters which constitute the state of the ratio 12, in engagement or in the course of engagement, the speed of rotation 18 of the converter 3 and the load 17 of the heat engine 1.

The signal 18 issuing from the tap 20 (FIG. 3) for measuring the rotational input or output speed of the torque converter 3 is shaped in a device 69 which may be, for example, a positive reaction comparator. The signals issuing from the device 69 control a monostable circuit 70 to which a conventional type of integrator circuit 71 is associated. In accordance with the invention, the monostable circuit 70 is branched in such a manner that the signal issuing from the integrator 71 is a decreasing linear function of the rotational speed shown by the input signal 18. This particular branching has, first, the advantage of diminishing undulation of the output voltage of the integrator circuit 71. Further, in the event of failure of the tap 20, the output voltage issuing from the integrator circuit 71 becomes maximal which causes, as will be seen later on, a maximal transfer voltage 22 at the output of the control generator 21 and thus a maximal line pressure 14. Thus this particular branching of the circuit 70 is a safety factor for the hydraulic members actuated by the line pressure 14 in the event of failure of the tap 20.

The information relative to the engaged ratio comes, as has been seen, from the electronic device 11 which supplies two signals 12a (or e1) and 12b (or e2). The signal 32 goes to an operator circuit which supplies a complementary signal e2. The signals e1 and e2 are either at a maximum value (a Boolean 1) or at a minimum value (a Boolean 0), and their combination makes it possible to mark all ratios in engagement or in the course of engagement of the transmission, as can easily be gathered from FIG. 9.

The voltage signal issuing from the integrator 71 and constituting a measure of the rotational speed of the torque converter is introduced into the circuit 73 on one of the inputs of the operational amplifier 73a, which comprises a counter-reaction coupler 73b comprising a circuit having resistances and a field effect transistor mounted in a manner per se known. The conduction or blockage of this field effect transistor is obtained by means of the signal e1, which causes commutation of the resistances contained in the coupler 73b so as to vary the gain of the amplifier 73a.

Figure 12:
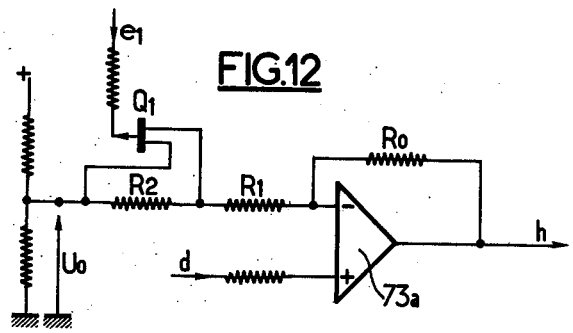
FIGS. 12, 13, 14, 15 and 16 illustrate embodiments of certain elements of the control generator of FIG. 7.

FIG. 12 illustrates by way of example a specific embodiment of the circuit 73. The counter-reaction coupler comprises two resistances R1 and R2. The resistance R2 may be short-circuited by the conduction of the field effect transistor Q1 which is controlled by the signal e1. The voltage Uo is a predetermined continuous positive voltage. It will be seen that the gain of the assembly varies according to whether Q1 is or is not conductive.

The load of the heat motor shown by the signal 17 is provided by the tap 19, seen in FIG. 3, which may, for example, be an angularly positioned tap determining the angle of rotation of the acceleration paddle. A safety circuit 76 branches at the output of the tap 19, so as to function in case of failure of the latter. The safety circuit 76 may, for example, be a circuit capable of reacting as soon as the input signal 17 exceeds a predetermined value which does not correspond to normal functioning of the tap 19. In this event, the safety circuit 76 supplies a zero signal which makes it possible, as will be seen further on, to obtain a maximal transfer voltage 22 at the output of the drive generator 21 which again constitutes a safety factor for the drive elements of the transmission.

Figure 13:
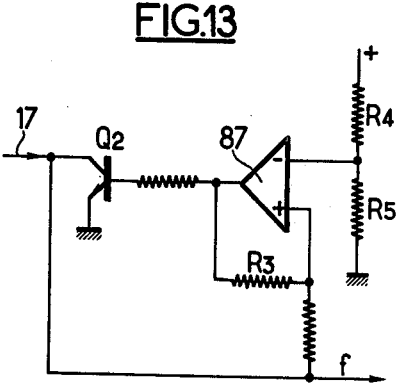

FIG. 13 illustrates by way of example an embodiment of such a safety circuit. A comparator 87 functions as soon as the signal 17 exceeds a predetermined limit value, thereby causing conduction of the transistor Q2 and earthing of the signal 17. The comparator 87 is maintained in the same condition thanks to the reaction resistance R3. The tripping threshold, which is slightly above the mentioned limit value, is regulated thanks to the resistances R4 and R5.

The signal 17 which, as will be seen later on, is represented by a straight line segment as a function of the load of the motor, is sent into a function generator 78 which supplies a voltage 79 differing with the load of the thermomotor according to a predetermined experimental law, making it possible, as will be seen further on, to obtain the system of curves of FIG. 2.

Figure 14:
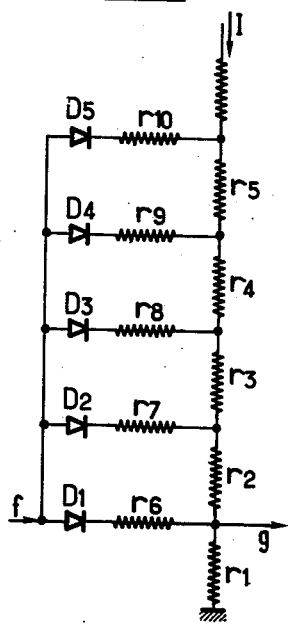

FIG. 14 illustrates by way of example an embodiment of the function generator 78. The resistances r1 to r5 determine the polarization of the diodes D1 to D5. The resistances r6 to r10 determine the gradient of each of the straight line segments obtained and thus make it possible to obtain a curve of approximate profile corresponding to an experimental curve, as will be seen further on.

The voltage 79 or translation voltage is introduced on the negative input of a first translation stage 80 comprising an operational gain amplifier unit branched into a summator-subtractor. The signal issuing from the amplifier 73 which is a function of the rotational speed parameters of the converter 18 and engaged ratio 12, is introduced on the positive input of the amplifier 80.

The signal issuing from the amplifier 80 is sent into a function generator 81 having a Zener diode of known type and which is also controlled by the signal e1 representing the state of the transmission ratio.

Figure 15:
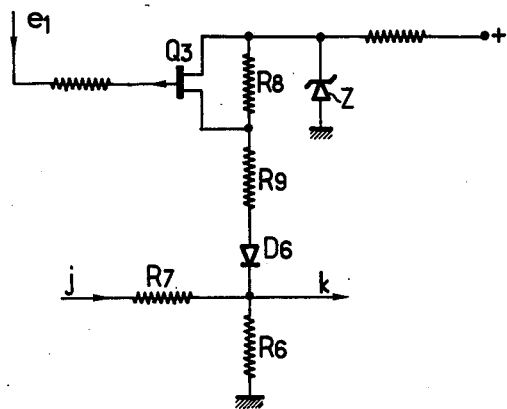

FIG. 15 illustrates by way of example an embodiment of the function generator 81. A Zener diode Z determines a reference potential U1. So long as the signals j issuing from the amplifier 80 have a value higher than the potential U1, the diode D6 is blocked and the output signal k is identical to the input signal j, the resistance R6 being great in relation to the resistance R7. When the signal j has a value below the potential U1, the diode D6 conducts, and a current proportional to the resistances R8 and R9 circulates, which results in a modification of the voltage k collected at the terminals of R6. The gradient of the curves k for values below U1 varies in accordance with the signal e1 which controls the field effect transistor Q3 capable to short-circuit the resistance R8.

The signal issuing from the function generator 81 as well as a continuous fixed voltage 82 control a summation-subtraction stage 83. The signal issuing from said stage 83 as well as the voltage 79 corresponding to the signal 17 determining the load of the thermo-motor control a second translation stage 84 comprising an operation amplifier branched into a summator-subtractor.

Finally, a variable gain amplifier 85a comprising a feedback loop 85b is controlled by the signal issuing from the stage 84, on the one hand, and the signals 12 relative to the engaged ratio, that is, the signals e1 and e2. The feedback loop 85b may advantageously comprise a circuit having resistances and field effect transistors, as illustrated by way of example in FIG. 16 which shows the assembly 85. The amplifier 85a receives on its positive input the signal 1 issuing from the stage 84. The signals e1 and e2 each control a field effect transistor Q4 and Q5, respectively, which is connected through the intermediary of a resistance R11 and R12, respectively, to the negative input of the amplifier 85a. The gain of the latter varies, therefore, according to the state of the signals e1 and e2, the gain being equal to one when the signals e1 and e2 are high, thus blocking the transistors Q4 and Q5.

The functioning of the electronic control generator in accordance with the invention supplying the transfer voltage 22 will now be briefly described with reference to FIGS. 8 to 11.

Figure 8:
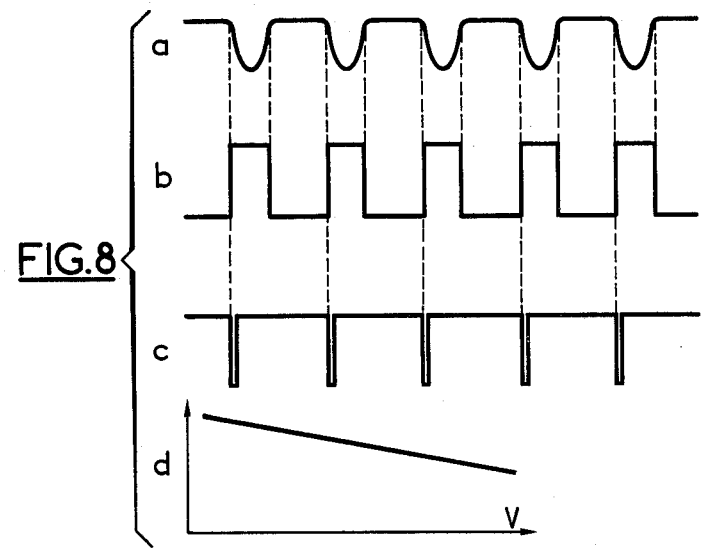
FIGS. 8, 9, 10 and 11 show the forms of signals obtained at different points of the control generator of FIG. 7 as a function of the data or information relative to the movement of the automotive vehicle.

The signal 18 issuing from the speed tap 20 (FIG. 3) is indicated at a in FIG. 8. The speed tap 20 may detect, for example, the passage of rotating metallic elements. The impulses a supplied by the tap 20 are formed by the circuit 69 which delivers rectangular signals b in FIG. 8 and whose frequency is proportional to the rotational speed of the detected metallic elements. Said signals b are transformed by the monostable circuit 70 into a succession of impulses indicated at c in FIG. 8. The integrator device 71 transforms the impulse signals c into a continuous voltage indicated at d in FIG. 8, which is a decreasing linear function of the rotational speed V of the converter of the speed box, so as to constitute a safety factor in the event of failure of the tap 20, as has been seen further above.

FIG. 9 shows the signals representing the data relative to the engaged ratio. The signal e1 is at the level 0 for the first speed and the reverse movement, and at the level 1 for the second and third speeds. The signal e2 is at the level 0 for the first and second speeds as well as for reverse movement, and at the level 1 for the third speed. The signal ē2 is the complement of the signal e2. It will be seen in the truth table of FIG. 9 that each speed is marked in unique manner. It will also be noted that the signal e1 is identical for the second and third speeds while the signal e2 and its complement ē2 are identical for the first and second speeds as well as for reverse movement.

Figure 10:
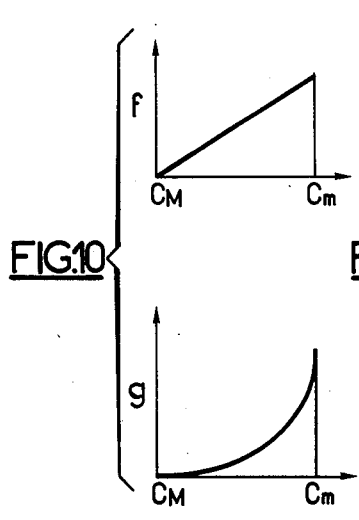

FIG. 10 shows the voltage f which is inversely proportional to the load of the motor C. The voltage f represented by a straight line segment is zero for the maximal motor load CM, and it is maximal for the minimal load Cm. The voltage of the curve f after transformation by the function generator 78 becomes the voltage shown on the curve g of FIG. 10. This voltage is also zero when the motor load is maximal, and it subsequently increases when the motor load decreases down to Cm, according to a predetermined experimental law which makes it possible to obtain aligned points of fracture on the final curve system. If the motor load is represented as usually by an angle $\alpha$ varying between 10° and 90°, then the curve g constituted by a succession of straight line segments has a profile approaching a law of the type $K(1-\sin \alpha)$ or K and a constant.

Figure 11:
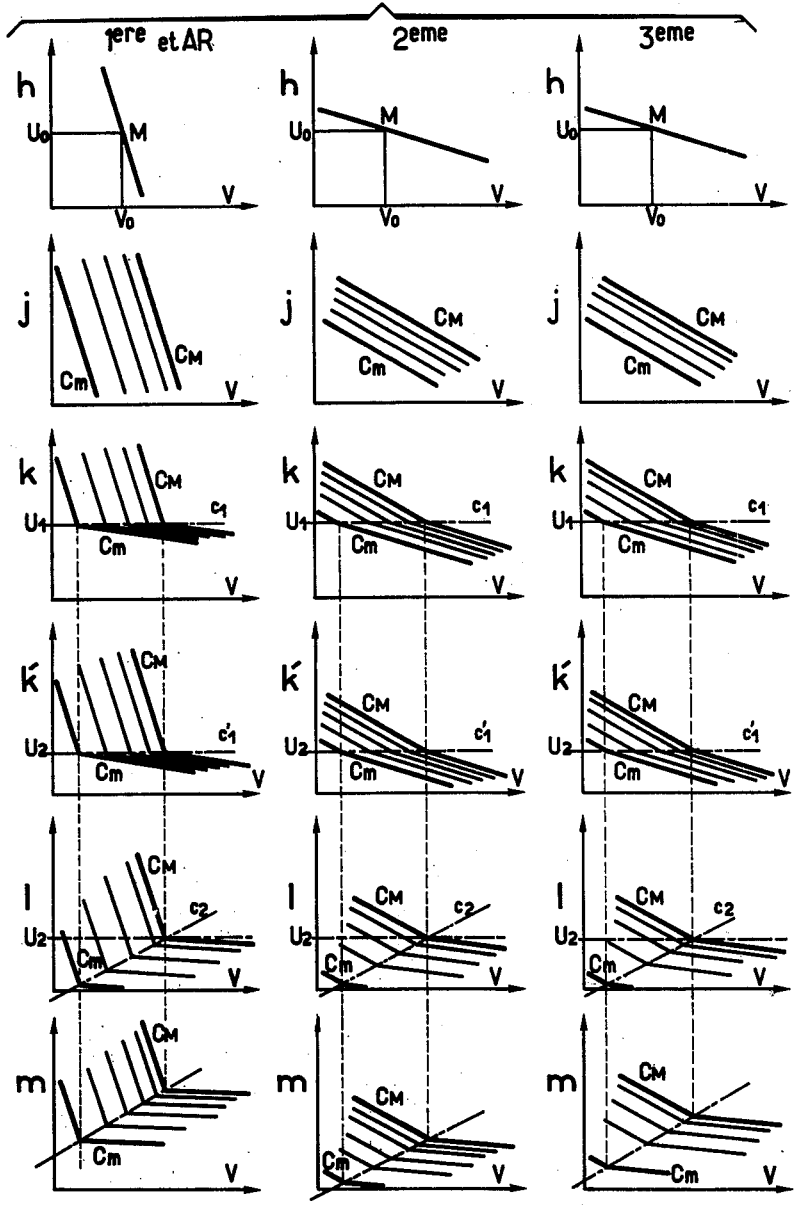

The signals constituted by a point of the curves d and e1, respectively, are sent into the circuit 73 so that the signal issuing from the amplifier 73 shown at h in FIG. 11 may be represented by an assembly of straight lines whose gradient varies as a function of the engaged ratio R. The voltage h of FIG. 11 is thus a decreasing linear function of the speed V of the converter, the gradient being a function of the engaged ratio R.

As will be seen in FIG. 12, the transistor Q1 is conducting at first speed or reverse movement, the gain of the assembly 73 then being $1 + Ro/R1$. At second and third speeds, the gain on the contrary is $1 + Ro/(R1 + R2)$. The straight lines obtained all pass through a point M for a predetermined continuous positive voltage Uo corresponding to a speed Vo (FIG. 11).

The voltage h issuing from the amplifier 73 undergoes translation with the aid of the translation voltage 79 shown on the curve g of FIG. 10 introduced into the translation stage 80 which supplies at its output a system of parallel straight lines indicated at j in FIG. 11. The system j expresses the voltage as a function of the speed V, the gradient of each of these straight lines being a function of the engaged ratio R and their respective spacing being a function of the load C of the thermomotor. It will be noted that the more the load increases the more the spacing between the straight lines decreases.

The Zener diode function generator 81 supplies, starting from the system j of parallel straight lines, a system of voltage characteristics k (FIG. 11), constituted of straight line segments of different gradients, the fracture points being located on a horizontal line c1 of voltage U1. The portions located above the horizontal line c1 do not see their gradient modified, while the gradient of the line segments located below the horizontal line c1 is diminished in relation to the system j. The change of gradient is different according to the signal e1, as has been seen with reference to FIG. 15.

The system of characteristics k undergoes a first vertical translation defined by the continuous voltage 82 and effected by the summator-subtractor element 83. This translation makes it possible to obtain at the output of the control generator a transfer voltage 22 corresponding exactly to the desired line pressure, a voltage of 1 volt corresponding to a line pressure of 1 bar. The system of characteristics k' obtained comprises line segments of different slope, the points of discontinuity being located on a horizontal line c'1 of voltage U2 (82).

The system k' of characteristics of voltage issuing from 83 undergoes a second vertical translation through the medium of the summator-subtractor element 84 which is controlled by the signal 79 corresponding to the curve g of FIG. 10. At the output of the element 84, the system of characteristics l is obtained on which the lines c2 joining the points of discontinuity are inclined in relation to the horizontal. The characteristic corresponding to the maximal load CM of the system k' is not modified by this operation. Further, as may be observed, all points of discontinuity are located on a line c2, due to the particular choice of the curve g and taking into account the variable spacing between the various line segments for the specific motor loads.

In order to obtain a transfer voltage corresponding exactly to the system of characteristics of FIG. 2 for a given engaged ratio, it may further be necessary, depending on the engaged ratio, to subject the system of characteristics l to renewed transformation of the ordinates so that the value of the linear pressure take into account the engaged ratio. This is accomplished in the programmable gain amplifier 85 by the signals e1 and e2. The system of characteristics m of FIG. 11 is obtained. It will be noted that the abscissae of the points of discontinuity of the different curves of characteristics k, k', l and m are preserved by the various above-mentioned transformations, for the same engaged ratio, as will be seen in FIG. 11.

Figure 16:
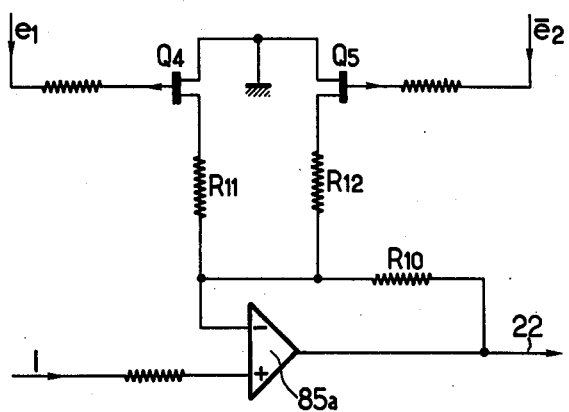

As will be seen in FIG. 16 in the first speed and reverse movement, the signal e1 controlling the transistor Q4 is zero, thus Q4 is a conductor, while Q5 is blocked since the signal e2 is at the level 1. The gain of the circuit 85 is therefore 1 + R10/R11. In second speed, according to the same reasoning, Q4 and Q5 are an infinite resistance. The gain of the circuit 85 is equal to 1 and the circuit acts as a voltage follower. In third speed, the transistor Q5 is conductive while Q4 is blocked. The gain is 1 + R10/R12. One thus obtains three gain values and the systems of characteristics m of FIG. 11, which are exactly the sought-after systems such as that of FIG. 2 and constitute the signal 22 emerging from the control generator at a predetermined proportionality ratio with the line pressure 14 (1 volt corresponding to 1 bar).

Thus, thanks to the particular construction of the drive generator, the present invention makes it possible to adapt control easily to the particular characteristics of a transmission and of a heat engine. Further, the structure of the control proper makes it possible to provide a device which is simple and has good characteristics from the point of view of control.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for controlling the supply pressure of the control members of an automatic transmission for vehicle power units, said apparatus comprising a control generator element supplying an electrical command voltage which is directly proportional to said supply pressure as a function of electrical signals representing information relative to the functioning of said transmission and of the vehicle power unit, said information comprising the state of the transmission, whether in engagement or between engagements due to inherent circuit delay, the ratio engaged or about to be engaged, the rotational speed of a transmission member, and the load of the vehicle power unit, said apparatus comprising in combination therewith:

first means for supplying a first voltage which is a decreasing linear function of the said rotational speed and whose gradient is a function of the state of the transmission ratio, second means for supplying, starting from the said first voltage, a second voltage which is a decreasing linear function analogous to said first voltage but whose position is displaced as a function of the said load, third means for supplying, starting from said second voltage and from the information relative to the state of the transmission ratio, a third voltage which is a decreasing function of the rotational speed and comprises two linear portions connected by a point of discontinuity, the respective gradients of each of said linear portions being a function of the state of the transmission ratio, and fourth means supplying, starting from said third voltage and from the information relative to the said load, a fourth voltage which is a decreasing function of the rotational speed and comprises two linear portions connected by a point of discontinuity whose position is a function of the load, said control generator element being responsive to said four voltages for supplying said command voltage.

2. Apparatus in accordance with claim 1 wherein the control generator further comprises fifth means for achieving a third transformation of the input signal, starting from the signal corresponding to the state of the transmission ratio in engagement or in the course of engagement.

3. Control apparatus in accordance with claim 1 having a primary return loop supplying an electrical signal and provided with a pressure tapping element,
   an electro-hydraulic transducer, and
   a secondary return loop supplying a hydraulic input signal to an electro-hydraulic transducer.

4. Apparatus in accordance with claim 3 wherein the electro-hydraulic transducer comprises a hydraulic potentiometer fed through the intermediary of a voltage-duration converter receiving the above-mentioned electrical signal from the primary loop.

5. Apparatus in accordance with claim 4 wherein the hydraulic potentiometer comprises an electromagnetic ball check valve kept in a position of equilibrium.

6. Apparatus in accordance with claim 3 wherein the electro-hydraulic transducer is fed through the intermediary of a voltage-current converter receiving the above-mentioned electrical signal from the primary loop.

7. Apparatus in accordance with claim 1 wherein said first means comprise an amplifier device having means for varying the gain receiving a signal as a function of the transmission ratio in engagement or in the course of engagement.

8. Apparatus in accordance with claim 7 wherein said first means further comprise a mono-multivibrator fed by a signal of a frequency which is proportional to said rotational speed, and
   an integrator circuit branched so as to supply a voltage which decreases as a function of the rotational speed.

9. Apparatus in accordance with claim 1 wherein said second means comprise a means for achieving a first translation of the input signal.

10. Apparatus in accordance with claim 9 wherein the second means further comprise a working generator supplying to the translation device a translation voltage which decreases as the load increases.

11. Apparatus in accordance with claim 10 wherein the second means further comprise a safety circuit supplying zero voltage at its output while its input voltage exceeds a predetermined limit value.

12. Apparatus in accordance with claim 1 wherein said third means comprise a working generator.

13. Apparatus in accordance with claim 1 wherein the fourth means comprise a device achieving a second translation of the input signal starting from a translation voltage decreasing as the load increases.

* * * * *